United States Patent
Hait

(10) Patent No.: US 6,350,846 B1
(45) Date of Patent: Feb. 26, 2002

(54) AROMATIC-ALIPHATIC COPOLYCARBONATES AND METHOD

(75) Inventor: Sukhendu Bikash Hait, Tuscaloosa, AL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,752

(22) Filed: May 31, 2001

(51) Int. Cl.[7] .............................................. C08G 64/00
(52) U.S. Cl. ...................................................... 528/196
(58) Field of Search ......................................... 528/196

(56) References Cited

U.S. PATENT DOCUMENTS

| | | | |
|---|---|---|---|
| 4,948,871 A | 8/1990 | Fukuoka et al. | 528/481 |
| 5,204,377 A | 4/1993 | Fukawa et al. | 528/481 |
| 5,214,073 A | 5/1993 | Fukawa et al. | 528/481 |
| 5,717,056 A | 2/1998 | Varadarajan et al. | 528/196 |
| 6,060,576 A | 5/2000 | Wisnudel et al. | 528/196 |

FOREIGN PATENT DOCUMENTS

| WO | 14453 A1 | 3/2001 | |
|---|---|---|---|

*Primary Examiner*—Terressa M. Boykin
(74) *Attorney, Agent, or Firm*—Andrew J. Caruso; Noreen C. Johnson

(57) ABSTRACT

The present invention discloses improved copolycarbonates and methods for their synthesis that involve the incorporation of aliphatic diol carbonates into copolycarbonate chains under solid state polymerization conditions. More particularly, the present invention utilizes diphenyl carbonate in the production of copolycarbonates that exhibit modified thermal properties(lower Tg) relative to analogous simple copolycarbonates. The solid sate polymerization technique possesses a distinct advantage over melt polymerization in that no specialized melt polymerization equipment is required.

15 Claims, No Drawings

AROMATIC-ALIPHATIC COPOLYCARBONATES AND METHOD

BACKGROUND OF INVENTION

The present invention describes improved aromatic-aliphatic copolycarbonates and a method for their synthesis that involves the reaction of polycarbonate resin and an aliphatic diol carbonate such as polyhexamethylene carbonate (PHMC) under solid state polymerization (SSP) conditions. More particularly, the present invention employs diphenyl carbonate to assist in the production of crystalline mixtures of polycarbonate oligomers and aliphatic diol carbonates which when subjected to solid state polymerization afford high molecular weight copolycarbonates that demonstrate better flow and ductility behavior and lower glass transition temperature ($T_g$) values than corresponding homopolycarbonates.

In recent years, significant attention has focused on aromatic-aliphatic copolycarbonates. These valuable materials have several desirable properties, including enhanced tensile elongation, transparency, and excellent low-temperature characteristics. Traditionally, two techniques have been utilized in the production of polycarbonates: melt phase carbonate interchange reactions and interfacial polycondensation processes.

In a typical melt phase process, a bisphenol is contacted with a diary carbonate in the melt in the presence of a suitable catalyst. An oligomeric polycarbonate is produced, usually with a weight average molecular weight in the range of 2,000–10,000 as determined by gel permeation chromatography, which may be relative to polycarbonate or polystyrene. The oligomer is then converted to a high molecular weight polycarbonate by increasing the polymerization temperature.

Significant disadvantages accompany melt phase processes. For example, at very high conversions (>98%), the melt viscosity increases considerably. Handling of high viscosity melt polymerization mixtures at high temperature is difficult. There is an increased chance of poor mixing and generation of hot spots leading to loss of product quality. In addition, this route requires specially designed equipment such as a Helicone mixer operating at temperatures in the range of 270 350° C.

Methods in the second category, i.e., interfacial polycondensation reactions, utilize a dihydroxyaromatic compound such as bisphenol A (BPA). The dihydroxyaromatic compound is contacted with phosgene in a mixed aqueous-organic solution in the presence of an acid acceptor such as sodium hydroxide and an amine as catalyst. An alternative technique involves the interfacial preparation of oligomeric chloroformates, which are subsequently converted to high molecular weight polycarbonates via condensation polymerization.

Like melt phase carbonate interchange reactions, however, interfacial polycondensation processes suffer several disadvantages. First, toxic and hazardous phosgene is utilized in these reactions. Also, the interfacial polycondensation process employs a chlorinated hydrocarbon, such as methylene chloride, as the organic solvent which requires substantial and costly environmental management to prevent unintended solvent emissions. Furthermore, the product poly(arylcarbonate) contains residual sodium and chloride ions which adversely affect the hydrolytic stability of the product.

Recently, SSP has been used to prepare high molecular weight polycarbonates. SSP utilizes substantially lower temperatures, in the range of 180–230° C., than those required in the melt process. This process does not require handling melt at high temperatures and the equipment needed to perform the reaction is very simple. In a typical solid state polycondensation process, a suitable oligomer in the form of a pellet or a powder is subjected to programmed heating above the glass transition temperature of the polymer but below its sticking temperature with removal of volatile by-product such as phenol and diphenyl carbonate. The polycondensation reaction proceeds strictly in the solid state under these conditions.

In a typical SSP process, a low melt viscosity linear oligomer is synthesized by the melt phase reaction of a bisphenol with a diaryl carbonate. Usually, a mixture of a dihydroxydiaryl compound and a diaryl carbonate is heated at 150° C. to 325° C. for 4 to 10 hours in presence of a transesterification catalyst to prepare an oligomer having an average molecular weight of 2,000–10,000 and having both hydroxyl and carbonate end groups. Thereafter, crystallization of the linear poly (arylcarbonate) oligomer may be effected either by dissolving the oligomer in a solvent and evaporating the solvent in presence of a suitable catalyst, or suspending the oligomer in a diluent and refluxing the mixture for 0 to 10 hrs in the presence of a suitable catalyst followed by evaporating the diluent. Alternatively, heating the oligomer at a temperature which is greater than its glass transition temperature but less than its melting point ($T_m$) in the presence of a suitable catalyst may be used to effect a thermal crystallization of the polycarbonate. Illustrative solvents include aliphatic aromatic hydrocarbons, ethers, esters, ketones, and halogenated aliphatic and aromatic hydrocarbons. The resulting oligomer has a crystallinity of between 5% and 55% as measured by differential scanning calorimetry.

SSP, sometimes referred to as solid state polycondensation may be effectuated by heating the crystallized oligomer and a suitable catalyst. The reaction temperature and time may vary according to the type (chemical structure, molecular weight, etc.) of crystallized oligomer. However, it should be at least above the glass transition temperature and below the melting or sticking point of the oligomer. At this temperature the oligomer should not fuse during the solid state polycondensation. Since the melting point of the crystallized oligomer increases during the course of polycondensation, it is therefore desirable to increase the polycondensation temperature gradually over the course of the solid state polymerization reaction. Generally the temperature should be 10–50° C. below the melting point of the oligomer and in the range of 150–250° C., preferably between 180 and 220 ° C.

To allow the reaction to progress, the by-product can be removed from the reaction system during the SSP process. To achieve this objective, an inert gas is passed through the system which aids the removal of by-products. The inert gases which are generally used are $N_2$, He, Ar and the like, and the flow rate of the carrier gas varies from 0.1 to 4 L/min depending upon the type of reactor and the particle size of the oligomer. The rate of polycondensation may be dependent on the type and the flow rate of the carrier gas.

It is sometimes desirable to incorporate monomer units other than bisphenols, such as BPA, into the polycarbonate backbone in order to modify the physical properties of the polycarbonate. Where a polycarbonate having different physical properties, such as a lower Tg, than the bisphenol homopolycarbonate is desired, certain types of aliphatic comonomers may be incorporated affording a copolycarbonate possessing a new set of physical properties. Usually it is preferred that these comonomers provide aliphatic ester units in the resultant copolycarbonates. One method of copolycarbonate formation involves the interfacial copolymerization in the presence of phosgene, an acid acceptor and an amine catalyst of a bisphenol and an aliphatic alpha, omega- dicarboxylic acid that contains between 6 and 20 carbon atoms. Saturated acids are frequently preferred.

Polycarbonates incorporating aliphatic chains derived from such aliphatic dibasic acids are prized for their enhanced melt flow characteristics which are in turn attributed the lower Tg's these copolycarbonates exhibit relative to the corresponding homopolycarbonate.

The present invention improves upon existing copolycarbonate products and methods for their synthesis providing a polycarbonate comprising both aromatic and aliphatic carbonate linkages via a solid state polymerization process. It has been unexpectedly found that the incorporation of aliphatic diol carbonates into polycarbonate chains by SSP yields copolycarbonates that exhibit enhanced thermal characteristics.

SUMMARY OF INVENTION

The present invention addresses some of the problems encountered with previous copolycarbonates and methods, and provides further surprising and unexpected properties. These and further objects of the invention will be more readily appreciated when considering the following disclosure and appended claims.

In one aspect the present invention relates to a method for preparing copolycarbonates by solid sate polymerization comprising:

(A) combining in the molten state a homopolycarbonate derived from a dihydric phenol having structure I

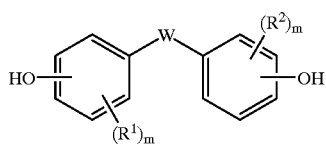

wherein $R^1$ and $R^2$ are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or $SO_2$ linking group, with an aliphatic diol carbonate having structure II

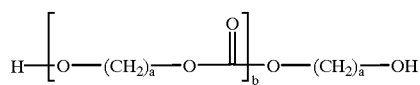

wherein a is an integer from 2 to 100 and b is an integer from 1–200, together with a sufficient amount of diphenyl carbonate to crystallize the mixture upon cooling; Step (B) cooling the mixture to ambient temperature to afford a crystalline mixture; and Step (C) subjecting said mixture to solid state polymerization, whereby a copolycarbonate incorporating repeat units derived from structures I and II is obtained.

The present invention further relates to copolycarbonates prepared by the method of the present invention that exhibit lower glass transition temperatures than corresponding homopolycarbonates.

DETAILED DESCRIPTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

As used herein the term "interfacial process" refers to a process comprising the simultaneous use of water and a water immiscible solvent.

As used herein the term "aromatic radical" refers to a radical having a valence of at least one comprising at least one aromatic group. Examples of aromatic radicals include phenyl, pyridyl, furanyl, thienyl, naphthyl, phenylene, biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

As used herein the term aliphatic diol carbonate refers to polycarbonate derivatives having structure II. Examples of aliphatic diol carbonates are polyhexamethylene carbonate (PHMC) and polybutylene carbonate.

In one aspect, the present invention describes improved copolycarbonates and methods for their synthesis that involve the incorporation of aliphatic diol carbonates into polycarbonate chains under SSP conditions.

In one embodiment of the present invention, a homopolycarbonate oligomer is first prepared by reaction of a dihydric phenol such as bisphenol A in the presence of a basic catalyst such as sodium hydroxide. The homopolycarbonate oligomer is thereafter combined with an aliphatic diol carbonate such as PHMC and mixed briefly in the molten state together with diphenyl carbonate. The diphenyl carbonate serves as a crystallization promoting additive. Upon cooling a partially crystalline mixture of the homopolycarbonate oligomer and the aliphatic diol carbonate is obtained. This mixture is subsequently crushed to a powder and subjected to SSP. The dihydric phenol, may be any of those known in the art to be useful for manufacturing polycarbonates. Examples of bisphenols having formula I include: bis(4-hydroxyphenyl) methane; 1,1-bis(4-hydroxyphenyl)ethane; 2,2-bis(4-hydroxyphenyl)propane (bisphenol-A); 2,2-bis(4-hydroxyphenyl)butane; 2,2-bis(4-hydroxyphenyl)octane; 2,2-bis(4-hydroxy-1-methylphenyl)propane; 1,1-bis(4-hydroxy-t-butylphenyl) propane; 2,2-bis(4-hydroxy-3-bromophenyl)propane; 1,1-bis(4-hydroxyphenyl) cyclopentane; 1,1-bis(4-hydroxyphenyl)cyclohexane; 4,4'-dihydroxydiphenyl ether; 4,4'-dihydroxy-3,3'-dimethylphenyl ether; 4,4'-dihydroxydiphenyl sulfide; 4,4'-dihydroxy-3,3'-dimethyldiphenyl sulfide; 4,4'-dihydroxydiphenyl sulfoxide; 4,4'-dihydroxy-3,3'-dimethyldiphenyl sulfoxide; 4,4'-dihydroxydiphenyl sulfone; and 4,4'-dihydroxy-3,3'-dimethyldiphenyl sulfone.

The aliphatic diol carbonate II is included at a level which depends upon its molecular weight and the desired $T_g$ of the copolycarbonate. Usually, the aliphatic diol carbonate is present at a level between approximately 2 weight percent and about 20 weight percent, based on the total weight of oligomeric homopolycarbonate employed. In preferred embodiments, the level of aliphatic diol carbonate is in a range between about 4 weight percent and about 10 weight percent. The specific level of aliphatic diol carbonate will depend as well upon the type of dihydric phenol that is employed, the desired molecular weight of the final polymer, and the desired $T_g$ of the final polymer. Aliphatic diol carbonates suitable for use in the present invention are illustrated by structure II. Examples of aliphatic diol carbonates having structure II are polydecamethylene carbonate, polyoctamethylene carbonate, polyhexamethylene carbonate, polybutylene carbonate and polyethylene carbonate.

Suitable catalyst systems for effecting copolycarbonate formation by solid state polymerization are also known in the art. Many of them include alkali metal salts such as sodium hydroxide. Where a catalyst has been employed in the preparation of the homopolycarbonate it is frequently unnecessary to add additional catalysts to effect SSP. Alternatively, a phase transfer catalyst system may be used. Examples include ammonium salts, phosphonium salts, and hexaalkyl guanidinium halides.

Where the homocopolycarbonate has been prepared by an interfacial method, usually, a chain-terminating agent is employed to control the molecular weight of the homocopolycarbonate oligomer. Examples of such agents include monohydroxyaromatic compounds such as phenol, p-t-butylphenol, and p-cumylphenol. The chain-terminating agent is usually present at a level in the range of about 10 to about 20 mole percent, based on the amount of dihydric phenol that is used.

The copolycarbonate prepared by the method of the present invention generally has a weight average molecular weight in the range of about 30,000 to 70,000 Daltons, preferably between approximately 45,000 and 65,000 Daltons as determined by gel permeation chromatography using $CHCl_3$ as an eluant, and a glass transition temperature in the range of about 100° C. to 165° C., preferably between 125° C. and 150° C.

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

In the present invention, the aliphatic diol carbonate is first mixed with an oligomeric homopolycarbonate in the melt in the presence of sufficient diphenyl carbonate to effect crystallization. Thereafter the partially crystalline product is ground to a powder and subjected to SSP. It is during the solid state polymerization step that the aliphatic diol carbonate is incorporated into high molecular weight polycarbonate chains. The products are copolycarbonates that exhibit lower glass transition temperature than the corresponding homopolycarbonates.

EXAMPLE 1

BPA polycarbonate oligomer (24.384 grams, 0.096 mole BPA), 0.576 grams of polyhexamethylene carbonate (PHMC, 0.004 moles), and 0.856 grams of diphenyl carbonate (0.004 moles), were charged into a tubular glass reactor equipped for mechanical stirring. The mixture was heated at 210° C. for 10 minutes under a nitrogen atmosphere. The molten polymer mixture was removed from the vessel, allowed to cool to room temperature, crushed to a fine particle size for SSP, and a twelve gram sample was heated under solid state polymerization conditions according to the following protocol:

Step 1: 200° C. for 1 hour
Step 2: 220° C. for 2 hours
Step 3: 240° C. for 2 hours Table 1 contains data for both an initial sample that was obtained prior to SSP and the product copolycarbonate.

TABLE 1

| Sample | $T_g$ (° C.) | $T_m$ (° C.) | ΔH (J/g) | Weight-average molecular weight | Number-average molecular weight |
|---|---|---|---|---|---|
| Initial polymer | 99 | 220 | 28 | 5570 | 2300 |
| Product copolycarbonate | 147 | 287 | 44 | 53,700 | 19,500 |

$^1$H-NMR analysis indicated the presence of BPA, hexamethalyne group in a 97.2:2.8 ratio.

EXAMPLE 2

BPA polycarbonate oligomer (23.368 grams, 0.092 mole BPA), 1.152 grams of PHMC (0.008 moles), and 1.712 grams of diphenyl carbonate (0.008 moles) were charged into a tubular glass reactor that was equipped for mechanical stirring. The mixture was heated at 210° C. for 30 minutes under a nitrogen atmosphere. Next, the molten polymer mixture was removed from the vessel, allowed to cool to room temperature, crushed to a fine particle size for SSP, and a twelve gram sample was heated according to the following protocol:

Step 1: 200° C. for 1 hours
Step 2: 220° C. for 2 hours
Step 3: 240° C. for 2 hours Table 2 contains data for both an initial sample that was obtained prior to SSP and the product copolycarbonate.

TABLE 2

| Sample | $T_g$ (° C.) | $T_m$ (° C.) | ΔH (J/g) | Weight-average molecular weight | Number-average molecular weight |
|---|---|---|---|---|---|
| Initial polymer | 73 | 216 | 23 | 5570 | 2300 |
| Product copolycarbonate | 129 | 268 | 31 | 51,500 | 21,500 |

$^1$H-NMR analysis indicated the presence of BPA and hexamethylene group in a 94.5:5.5 ratio.

The invention has been described in detail with particular reference to preferred embodiments thereof, but it will be understood by those skilled in the art that variations and modifications can be effected within the spirit and scope of the invention.

What is claimed is:

1. A method for preparing copolycarbonates by solid state polymerization comprising:

step (A) combining in the molten state a homopolycarbonate derived from a dihydric phenol having structure I

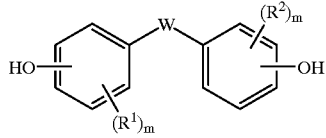

wherein R¹ and R² are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or SO₂ linking group, with an aliphatic diol carbonate having structure II

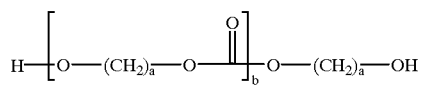

wherein a is an integer from 2 to 100 and b is an integer from 1–200, together with a sufficient amount of diphenyl carbonate to crystallize the mixture upon cooling;
step (B) cooling the mixture to ambient temperature to afford a
crystalline mixture; and
step (C) subjecting said mixture to solid state polymerization, whereby a copolycarbonate incorporating repeat units derived from structures I and II is obtained.

2. A method according to claim 1, wherein said dihydric phenol is selected from the group consisting of bis(4-hydroxyphenyl)methane, 1,1-bis(4-hydroxyphenyl)ethane, 2,2-bis(4-hydroxyphenyl)propane (bisphenol-A), 2,2-bis(4-hydroxyphenyl)butane, 2,2-bis(4-hydroxyphenyl)octane, bis(4-hydroxyphenyl)-methane, 2,2-bis(4-hydroxy-1-methylphenyl)propane, 1,1-bis(4-hydroxy-t-butylpropane, 2,2-bis(4-hydroxy-3-bromophenyl)propane, 1,1-bis(4-hydroxy4,4'-dihydroxydiphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, and 4,4'-dihydroxy-3,3'-dimethyldiphenyl sulfone.

3. A method according to claim 1, wherein said dihydric phenol is bisphenol-A.

4. A method according to claim 1, wherein said aliphatic diol carbontate is derived from a $C_2$–$C_{50}$ aliphatic diol.

5. A method according to claim 1, wherein said aliphatic diol carbonate is selected from the group consisting of:
polyethylene carbonate,
polybutylene carbonate,
polyhexamethylene carbonate (PHMC), and
polydecamethylene carbonate.

6. A method according to claim 1, wherein said aliphatic diol carbonate is PHMC.

7. A method according to claim 1, wherein the glass transition temperature (Tg) of said copolycarbonate ranges from about 100° C. to 149° C.

8. A method according to claim 1, wherein the melting point (Tm) of said copolycarbonate ranges from about 260° C. to 300° C.

9. A method for preparing copolycarbonates by solid sate polymerization comprising:
Step (A) combining in the molten state a bisphenol A homopolycarbonate oligomer having a weight average molecular weight in a range between about 2000 and about 10000 Daltons with an aliphatic diol carbonate having structure II

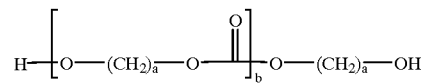

wherein a is an integer from 2 to 100 and b is an integer from 1–200, the amount of said aliphatic diol carbonate being equivalent to about 2 to about 10 percent by weight of the bisphenol A homopolycarbonate oligomer, together with a sufficient amount of diphenyl carbonate to crystallize the mixture upon cooling;
step (B) cooling the mixture to ambient temperature to afford a crystalline mixture; and
step (C) subjecting said mixture to solid state polymerization, whereby a copolycarbonate incorporating repeat units derived from bisphenol A and II is obtained.

10. A method according to claim 9, wherein said aliphatic diol carbontate is derived from a $C_2$–$C_{50}$ aliphatic diol.

11. A method according to claim 9, wherein said aliphatic diol carbonate is selected from the group consisting of:
polyethylene carbonate,
polybutylene carbonate,
polyhexamethylene carbonate (PHMC), and
polydecamethylene carbonate.

12. A method according to claim 9, wherein said aliphatic diol is PHMC.

13. A method according to claim 9, wherein the glass transition temperature (Tg) of said copolycarbonate ranges from about 100° C. to 149° C.

14. A method according to claim 9, wherein the melting point (Tm) of said copolycarbonate ranges from about 260° C. to 300° C.

15. A copolycarbonate comprising structural units derived from a dihydric phenol having structure I

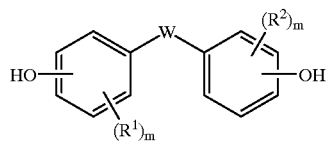

wherein R₁ and R₂ are independently fluorine, chlorine, bromine, aliphatic, cycloaliphatic or aromatic radicals, n and m are integers having values of 0 to 4, and W is an aliphatic radical, a cycloaliphatic radical an aromatic radical, or an oxygen, sulfur, SO or SO₂ linking group; and
an aliphatic diol carbonate having structure II

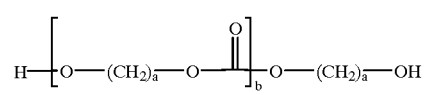

wherein a is an integer from 2 to 100 and b is an integer from 1–200.

* * * * *